(12) United States Patent
Holzwarth et al.

(10) Patent No.: US 9,539,895 B2
(45) Date of Patent: *Jan. 10, 2017

(54) TANK VENTING FILTER HAVING A CONSTRICTION IN THE AIR INLET AREA

(71) Applicant: MANN+HUMMEL GMBH, Ludwigsburg (DE)

(72) Inventors: Marcel Holzwarth, Ludwigsburg (DE); Daniel Schmid, Sachsenheim (DE); Florian Keller, Ludwigsburg (DE)

(73) Assignee: MANN+HUMMEL GMBH, Ludwigsburg (DE)

( * ) Notice: Subject to any disclaimer, the term of this patent is extended or adjusted under 35 U.S.C. 154(b) by 89 days.

This patent is subject to a terminal disclaimer.

(21) Appl. No.: 14/547,407

(22) Filed: Nov. 19, 2014

(65) Prior Publication Data
US 2015/0135956 A1 May 21, 2015

(30) Foreign Application Priority Data

Nov. 20, 2013 (DE) .......................... 10 2013 019 328

(51) Int. Cl.
*B01D 35/027* (2006.01)
*B60K 15/035* (2006.01)
*B01D 46/24* (2006.01)
*B01D 46/00* (2006.01)
*B60K 15/03* (2006.01)

(52) U.S. Cl.
CPC ......... *B60K 15/035* (2013.01); *B01D 46/0031* (2013.01); *B01D 46/2403* (2013.01); *B01D 2279/35* (2013.01); *B60K 2015/03236* (2013.01); *B60K 2015/03542* (2013.01)

(58) Field of Classification Search
CPC .............. B01D 35/027; B01D 46/2403; B01D 46/0023; B60K 15/03504; B60K 15/035; B60K 2015/03509
USPC ........... 55/385.4, 310, 385.1; 95/90; 96/131, 96/153; 137/589, 899; 210/838
See application file for complete search history.

(56) References Cited

U.S. PATENT DOCUMENTS

| | | | | |
|---|---|---|---|---|
| 6,015,444 | A * | 1/2000 | Craft ..................... | F16H 57/027 220/371 |
| 6,395,068 | B1 * | 5/2002 | Rooney .............. | B01D 53/0415 137/589 |
| 7,517,392 | B2 * | 4/2009 | Neff ........................ | F16K 17/19 137/176 |
| 7,678,169 | B1 * | 3/2010 | Gwin ..................... | B01D 45/06 123/41.86 |

(Continued)

FOREIGN PATENT DOCUMENTS

WO        2013088217 A1      6/2013

*Primary Examiner* — Jacob T Minskey
*Assistant Examiner* — Minh-Chau Pham
(74) *Attorney, Agent, or Firm* — James Hasselbeck

(57) ABSTRACT

A tank venting filter is provided with a housing defining a longitudinal filter axis that is vertically oriented in operation. The housing has a top end and a bottom end and is provided with an air inlet at the bottom end and with an air outlet at the top end. The air outlet is connectable to a tank. The housing is provided with a constriction above the air inlet. A filter element is disposed in the housing and fluidically arranged between the air inlet and the air outlet. The filter element is provided with a first filter. The constriction has an opening cross-section surface area that is less than 40% of an opening cross-section surface area of the air inlet.

11 Claims, 3 Drawing Sheets

(56) References Cited

U.S. PATENT DOCUMENTS

| | | | |
|---|---|---|---|
| 8,277,295 B2 * | 10/2012 | Yano | H05K 5/068 |
| | | | 361/694 |
| 8,388,746 B2 * | 3/2013 | Warren | B01D 46/0031 |
| | | | 55/310 |
| 8,409,313 B2 * | 4/2013 | Vivian | B01D 45/08 |
| | | | 55/320 |
| 8,529,657 B2 * | 9/2013 | Kincaid | F16H 57/027 |
| | | | 403/31 |
| 2003/0093981 A1 * | 5/2003 | Johannesson | F16H 57/027 |
| | | | 55/385.4 |
| 2008/0011667 A1 | 1/2008 | Ruschke | |
| 2009/0084078 A1 * | 4/2009 | Furuyama | F21S 48/335 |
| | | | 55/385.4 |
| 2011/0180466 A1 | 7/2011 | Kalauch | |
| 2015/0144548 A1 * | 5/2015 | Holzwarth | B01D 35/027 |
| | | | 210/323.1 |

\* cited by examiner

TANK VENTING FILTER HAVING A CONSTRICTION IN THE AIR INLET AREA

BACKGROUND OF THE INVENTION

The invention concerns a tank venting filter, in particular for a motor vehicle.

Filter systems for filtering media have been known for a long time, for example, from U.S. Pat. No. 4,470,296 A or DE 1 047 171 A.

In this context, it is also known to provide air filters for tanks, in particular for tanks of motor vehicles, by means of which the tanks can be vented with purified (ambient) air. U.S. Pat. No. 3,546,853 A and EP 1 647 320 B1 disclose, for example, tank venting filters which have at their bottom side a plurality of air inlets.

A similar tank venting filter is disclosed in U.S. Pat. No. 2,603,308 A wherein the tank venting filter comprises a chamber at its air outlet side which is delimited by two plates with small passage cutouts in order to prevent contamination of a filter element in the tank venting filter by fuel that is "splashing out" of the tank.

Moreover, EP 2 607 136 A1 discloses a tank venting valve that comprises a mechanically actuatable surge guard device in order to avoid contamination of the tank venting filter with fuel.

Finally, WO 2013/066217 A1 discloses a tank venting filter comprising a filter element that is protected by a cover from fuel possibly penetrating into the tank venting filter.

However, tank venting filters may become contaminated not only by the tank contents, for example, fuel or also a urea solution, that penetrates through an air outlet into the tank venting filter but also by water that passes through an air inlet into the tank venting filter. On the one hand, the water must not penetrate into the tank so as not to contaminate the tank contents. At the same time, the filter element of the tank venting filter must also be protected from becoming moist or completely wet so as not to compromise the performance of the filter element or the proper function of the tank venting filter.

The demands put on a tank venting filter with regard to protection of the filter from penetrating water as well as a water retention capability of the tank venting filter are relatively high, in particular because motor vehicles, when driving through rain or also in case of use of a high-pressure cleaner, are exposed to water aerosols which act with partially high pressure on the tank venting filter. Since the tank venting filter is a mass-produced article or disposable part, water protection of the tank venting filter must be simultaneously of a constructively simple design with regard to cost considerations.

It is therefore the object of the invention to provide a tank venting filter that provides an effective protection from penetrating water and, at the same time, is of a constructively simple configuration.

SUMMARY OF THE INVENTION

This object is solved by a tank venting filter that comprises, along its longitudinal filter axis that is vertically oriented in operation, an air inlet at the bottom and an air outlet at the top, connectable to a tank, and a filter element that is fluidically arranged between the air inlet and the air outlet and comprises a first filter; wherein the tank venting filter comprises a housing that has a constriction above the air inlet. The dependent claims provide expedient further embodiments of the invention.

The tank venting filter in accordance with the invention concerns a tank venting filter that, along its longitudinal filter axis that is to be oriented or is oriented vertically in operation (use) of the tank venting filter, is provided at the bottom end with an air inlet and at the top end with an air outlet connectable to the tank. The tank venting filter has a filter element that is a fluidically arranged between the air inlet and the air outlet and comprises a first filter, wherein the tank venting filter comprises a housing that is provided with a constriction above the air inlet.

In its mounted state, the tank venting filter is mounted vertically, i.e., oriented in direction of its longitudinal axis, in or on a motor vehicle. The tank venting filter is therefore described with regard to positional information "at the top, bottom, above etc." with respect to this mounted position. Moreover, the term "tank venting filter" is not to be understood such that the function of the tank venting filter is limited to venting of tanks. Instead, the tank venting filter can also act as a tank bleeding filter, for example, when a tank connected to the tank venting filter is filled with a fuel or lubricant or a different liquid. For reasons of simplification and clarity, the terms "air inlet" and "air outlet" are however described only with regard to a function as tank venting filter, i.e., for air intake into the (fuel) tank, as is the case in particular when operating a motor vehicle with an internal combustion engine.

The tank venting filter has at its bottom an air inlet above which a constriction is formed. The constriction is thus arranged between the air inlet and the filter of the tank venting filter that is arranged in the housing. By means of the constriction, it is effectively prevented that water penetrates into the interior of the housing of the tank venting filter. The constriction can moreover be used for attachment of the tank venting filter on a motor vehicle. Since the opening cross-section surface area of the tank venting filter above the constriction is widened, the air flow that is flowing to the filter element is slowed down in this area. Water drops or water droplets contained in the taken-in air can therefore be separated, following the force of gravity (sedimentation). Above the constriction, a particularly high water separation rate is obtained in this way. In other words, with the relatively large opening cross-section surface area of the air inlet, the flow rate of the air is reduced to a minimum. The smaller the flow rate of the air, the smaller the particle size up to which particles of the air flow can be entrained into the tank venting filter. This is the result of the force balance that is caused by the vertically downwardly oriented weight force of the particles and the vertically upwardly oriented force acting on the particles by the air flow. The critical diameter up to which the particles will follow the flow, i.e., are sucked in, or from which on the particles can no longer follow the flow, i.e., are no longer sucked in, is referred to as particle of critical size. The tank venting filter according to the invention has thus a particle of critical size that is very small. Like the particle of critical size, the maximum drop size of a liquid drop, in particular of a water drop, up to which they are still sucked in by the air flow is also very small.

The opening cross-section surface area of the constriction according to the invention can be less than 40%, in particular less than 30%, preferably less than 20%, especially preferred less than 10%, of the opening cross-section surface area of the air inlet. The filter element of the tank venting filter is therefore particularly effectively protected from penetrating water.

Viewed fluidically, between the constriction and the filter element a multi-angled air guiding device can be provided.

The air guiding device can be, for example, in the form of a labyrinth. The air guiding device can comprise several plates, projections, ribs and/or cutouts, in order to guide the air flow across a distance that is as long as possible to the filter element. In the air guiding device, the water that is contained in the sucked-in air can deposit by the effect of gravity.

Fluidically between the constriction and the filter element, a vertically oriented sedimentation chamber can be provided within the tank venting filter. In the sedimentation chamber, the water deposits by action of gravity. Preferably, the air guiding device is arranged in the sedimentation chamber and or formed therein.

The first filter of the filter element is preferably secured between a top end disk and a bottom end disk of the filter element. In a particularly preferred embodiment of the invention, the bottom end disk defines the top boundary of the sedimentation chamber.

The air guiding device can comprise at least one water passage cutout provided in a bottom area of the air guiding device. Preferably, the air guiding device has several water passage cutouts in the bottom area. Water separated within the tank venting filter in this case is simply guided through the water passage cutout(s) and father through the air inlet out of the tank venting filter.

The air guiding device may comprise at least one air passage cutout that is provided in a ceiling area of the air guiding device. Preferably, the ceiling area of the air guiding device has several air passage cutouts. Rising air passes therefore through the air passage cutout(s) to the filter element. At the same time, separated water can be guided through the water passage cutout(s) out of the tank venting filter.

In a particularly preferred embodiment of the invention, the at least one air passage cutout has a greater opening cross-section surface area than the at least one water passage cutout. Preferably, all air passage cutouts have a greater opening cross-section surface area than the water passage cutouts. Due to the greater opening cross-section(s) of the air passage cutout(s), it is prevented that the predetermined path of the air flow from the constriction to the filter element is shortened via the water passage cutout(s).

The air outlet of the tank venting filter can open at its bottom end into a downpipe that is connected fluidically with the air inlet. In this way, contamination of the filter element or of the filter material by "splashing" tank contents can be prevented. The term "open" is to be understood as a direct fluidic connection. In other words, the tank contents flows out of the air outlet immediately into the downpipe. The downpipe forms so to speak a catch basin for the tank contents which has retrogradely penetrated into the tank venting filter. It is particularly preferred that the downpipe is connected fluidically with the air inlet. Tank contents, in particular fuel from the tank, that reaches through the downpipe the tank venting filter, passes therefore via the air inlet out of the tank venting filter without contaminating the filter element. This is in particular helpful when a carbamide solution (urea solution) is contained in the tank because the filter element may be clogged or damaged thereby.

A particularly compact configuration of the tank venting filter can be achieved in that the first filter is arranged directly or indirectly about the downpipe. The first filter is preferably in the form of a star-shaped folded bellows in order to provide a large functional surface area of the filter. Preferably, the first filter is formed of cellulose in order to enable an effective particle filtration. The particle filter alternatively or additionally may be embodied of polymer fibers, a mixture of cellulose fibers and polymer fibers, and/or of a melt blown medium. Particularly preferred, the particle filter is embodied of a nanofiber medium.

According to the invention, a second filter can be arranged fluidically between the downpipe and the air inlet. The second filter prevents that unfiltered air can reach the air outlet via the downpipe. The second filter is preferably disk-shaped or mat-shaped in order to enable simple installation of the second filter in the tank venting filter. The second filter is preferably arranged in a bottom area of the downpipe.

With regard to manufacturing technological considerations, it has been found to be advantageous when the housing is embodied of plastic material. Preferably, a plastic material is used that is resistant with regard to diesel fuel, gasoline, and urea so that the tank venting filter is not damaged by the aforementioned materials, for example, when refilling the tank. In a preferred embodiment of the invention, the aforementioned second filter is injection-molded in a holder of plastic material. In this way, the second filter is seal-tightly connected in a constructively simple manner with the holder or the housing.

The second filter can be air-permeable but fuel-impermeable and/or urea-impermeable. In this way, filtration of air into the downpipe is enabled. At the same time, it is prevented that tank contents, in particular fuel, which passes from the tank into the downpipe can pass via the air outlet into the environment.

According to an alternative further embodiment, the second filter can be permeable for liquids, for example, fuel and/or urea solution. In this context, the second filter may be substantially permeable, or is permeable, for air but may also be impermeable. It is important that the flow resistance of the second filter for air is greater than the flow resistance of the first filter so that it is ensured that the air passes via the first filter element into the air outlet.

Due to the fuel permeability and/or urea permeability, the filter must not be manually emptied.

The second filter can advantageously be embodied of a nonwoven, a textile material and/or a microfiber material in order to obtain a particularly high filtration rate. Particularly preferred, the second filter is embodied of a polyester fabric.

For a fluidic connection between the interior of the downpipe and the first filter, the downpipe can comprise at least one downpipe passage cutout embodied transversely to the longitudinal axis. The downpipe passage cutout enables quick removal of sucked-in air through the air outlet. Preferably, the downpipe has a plurality of downpipe passage cutouts.

The downpipe passage cutout can be configured to ascend from the interior of the downpipe to the first filter. Accordingly, liquid that is splashing transverse to the longitudinal axis of the tank venting filter in the downpipe will not exit from the downpipe. Preferably, the downpipe has a plurality of downpipe passage cutouts which are embodied so as to ascend from the interior of the downpipe to the first filter.

In a particularly preferred embodiment of the invention, the tank venting filter is characterized in that the downpipe is connected fluidically with a collecting chamber, in particular one that is embodied below the downpipe. In the collecting chamber the tank contents which has reached the tank venting filter is collected and, for example, is disposed of by exchanging the tank vent venting filter.

Preferably, the collecting chamber can be emptied through a valve so that the tank contents that has passed into the tank venting filter can be discharged regularly from the tank venting filter.

The tank venting filter can be manufactured particularly simply and inexpensively when the tank venting filter, with the exception of connecting members, is embodied axially symmetrical to its longitudinal axis. The tank venting filter, in particular in the area of the filter element, is designed to be axially symmetrical to its longitudinal axis.

In a particularly preferred embodiment of the invention, the housing of the tank venting filter, with the exception of the connecting members, is embodied to be of rotational symmetry relative to its longitudinal axis. In this way, the tank venting filter can be manufactured in a particularly inexpensive way.

The invention concerns moreover a filter element for a tank venting filter as described above.

BRIEF DESCRIPTION OF THE DRAWINGS

Further features and advantages of the invention result from the following detailed description of three embodiments of the invention, with the aid of the drawing, showing details important to the invention, as well as from the claims.

The features illustrated in the drawing are illustrated in such a way that the special features according to the invention can be made clearly visible. The various features can be realized each individually or several combined in any combination in variants of the invention.

DESCRIPTION OF PREFERRED EMBODIMENTS

Figure 1:
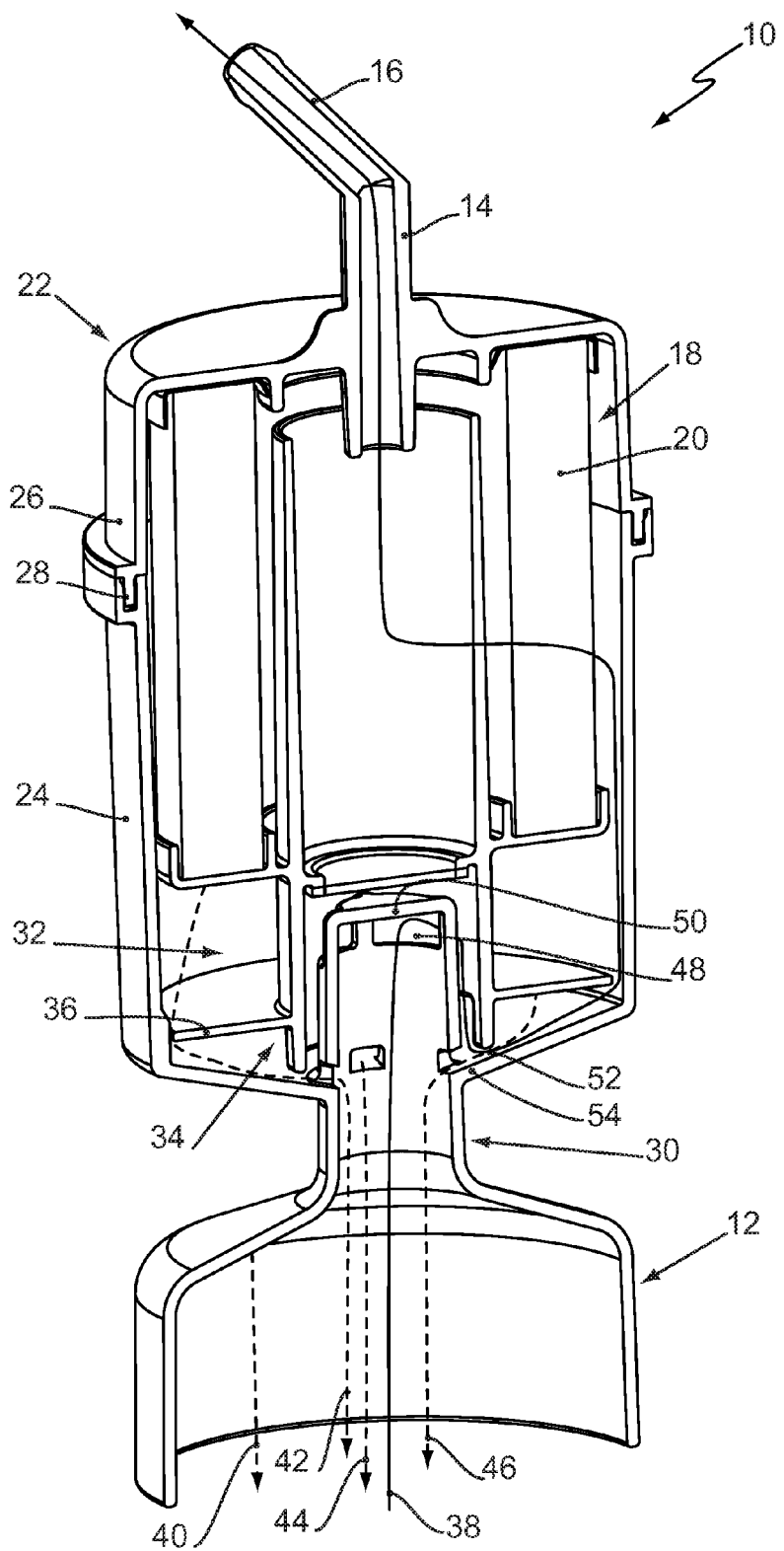
FIG. 1 shows a sectioned perspective view of a first embodiment of tank venting filter.

FIG. 1 shows a first tank venting filter 10. The tank venting filter 10 serves for venting and bleeding a tank (not shown). The tank venting filter 10 has an air inlet 12 and an air outlet 14. The air outlet 14 is connectable by means of a connecting member 16 with the tank. The air outlet 14 serves for attachment of the tank venting filter 10 on a motor vehicle.

The tank venting filter 10 comprises a filter element 18 with a first filter 20. The first filter 20 has a star-shaped folded filter material for filtering air that has flown in via the air inlet 12 into the tank venting filter. In this way, the tank contents is kept free of contaminants contained in the air, for example, dirt particles which otherwise would be sucked into the tank as the tank contents decreases.

The tank venting filter 10 has a housing 22 with a bottom housing half 24 and a top housing half 26. The two housing halves 24, 26 are connected to each other at a radial connecting location 28 by means of a friction welded seam. The first tank venting filter 10 can therefore be produced particularly inexpensively.

The air inlet 12 is embodied in the lower housing half 24. The lower housing half 24 has a constriction 30 above the air inlet 12. The constriction 30 serves for receiving a clamp (not shown) for attachment of the first tank venting filter 10 on the motor vehicle. Primarily, the constriction 30 serves however for separation of water which is penetrating via the air inlet 12. In particular snow, hail, water aerosol, splashing water and the like are prevented by the constriction 30 from penetrating farther into the first tank venting filter 10.

Above the constriction 30, the first tank venting filter 10, here the lower housing half 24 of the first tank venting filter 10, has a sedimentation chamber 32. The sedimentation chamber 32 serves for further gravitational separation of water and particles. The opening cross-section surface area, i.e., the surface area of the opening transverse to the longitudinal axis of the first tank venting filter 10, of the sedimentation chamber 32 is significantly greater than the opening cross-section surface area of the constriction 30. The air flow that is entering from the constriction 30 into the sedimentation chamber 32 is therefore slowed down such that even small and smallest water droplets as well as small and smallest particles can be separated.

In the sedimentation chamber 32, as shown in FIG. 1, a multi-angled air guiding device 34 can be provided. The air guiding device 34 has a first plate 36 and several projections, not provided with reference characters for reasons of clarity, in order to lengthen the path of the air between the constriction 30 and the filter element 18 and, at the same time, to produce abrupt directional changes of the air flow. Accordingly, as a whole, a higher water separation rate and particle separation rate can be achieved. In this way, the filter element 18 as well as the tank contents can be protected efficiently from moisture and particles. The first plate 36, as shown in FIG. 1, can be monolithically embodied together with the bottom end disk of the filter element 18.

In FIG. 1, a path of the air from the air inlet 12 to the connecting member 16 is illustrated in an exemplary fashion by a solid arrow 38. Dashed-line illustrated arrows 40-46 show in an exemplary fashion the path of the water from the air inlet 12 sedimented in the first tank venting filter 10.

FIG. 1 shows that the air guiding device 34 of the first tank venting filter 10 comprises several air passage cutouts of which, for reasons of clarity, only a first air passage cutout 48 is identified with a reference character. The air passage cutouts, for example, the first air passage cutout 48, are formed in a ceiling area 50 of the air guiding device 34. The air guiding device 34 has moreover several water passage cutouts of which, for reasons of clarity, only a first water passage cutout 52 is provided with a reference character. The water passage cutouts, for example, the first water passage cutout 52, are formed in a bottom area 54 of the air guiding device 34. In this way, the water that has been separated in the sedimentation chamber 32 flows without barriers into the constriction 30 and subsequently farther into the air inlet 12. The opening cross-section surface area of the air passage cutouts, for example, of the first air passage cutout 48, is greater than the opening cross-section surface area of the water passage cutouts, for example, the first water passage cutout 52. In this way it is substantially prevented that the airstream utilizes a "shortcut" through the water passage cutouts, for example, the first water passage cutout 52, instead of taking the predetermined longer path across the air passage cutouts, for example, the first air passage cutout 48.

Figure 2:
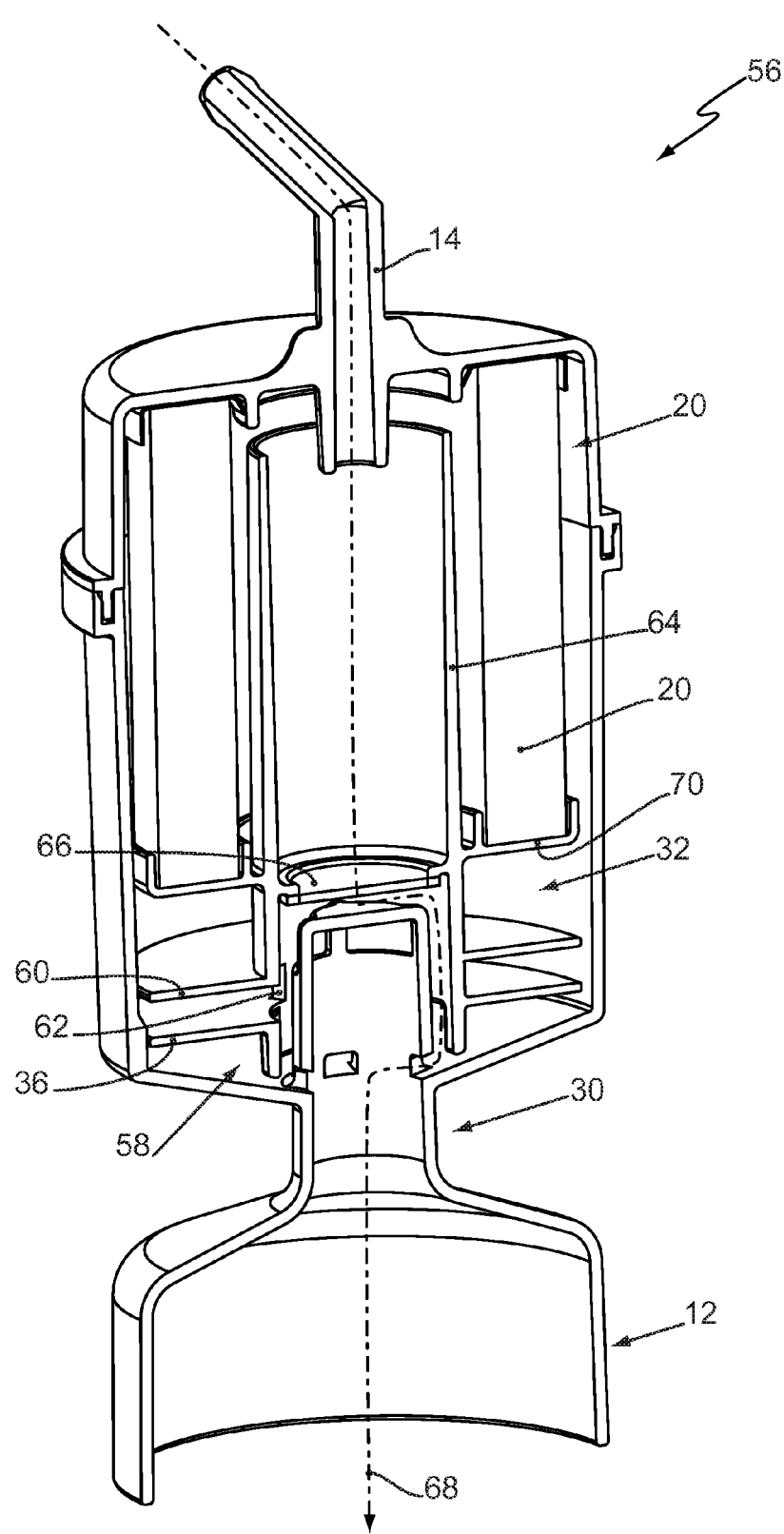
FIG. 2 shows a sectioned perspective view of a second embodiment of a tank venting filter.

FIG. 2 shows a second tank venting filter 56. The second tank venting filter 56 corresponds with the exception of the air guiding device 58 to the first tank venting filter 10 according to FIG. 1. Same features of the tank venting filter 10, 56 are therefore provided with same reference characters.

The air guiding device 58 comprises the first plate 36, a second plate 60, and a rib passage cutout 62 that is formed above the first plate 36. By means of the rib passage cutout 62, sedimented water flows between the plates 36, 60 into the constriction 30. The additional second plate 60 enlarges the surface area of the sedimentation chamber 32 which is flowed across by the air so that the water separation rate and the particle separation rate are increased.

In particular for mobile applications of the tank venting filter, as e.g. in motor vehicles, "splashing" of the tank contents, in particular of fuel and/or of a urea solution, into the tank venting filter 56 may occur. This would cause damage to the first filter 20. The second tank venting filter 56 is however protected from such contamination of the first filter 20 by the tank contents, as will be described in the following.

The air outlet 14 opens into a downpipe 64. The downpipe 64 is fluidically connected by means of a second filter 66 with the sedimentation chamber 32. The second filter 66 is attached to the inner side of the downpipe 64 and can be in particular fused with the downpipe 64. The second filter 66 is permeable for the liquid tank contents, i.e., for example, fuel or urea solution, in order to enable drainage of the tank contents from the downpipe 64 into the sedimentation chamber 32 and finally into the air inlet 12. A dash-dotted illustrated arrow 68 shows in an exemplary fashion the path of the fuel contents through the second tank venting filter 56. The downpipe 64 is positioned at a radial spacing away from the first filter 20 and is embodied monolithically with the bottom end disk 70 of the filter element 18. The first plate 36 and the second plate 60 are formed integrally on the exterior side of a bottom length section of the downpipe 64.

Figure 3:
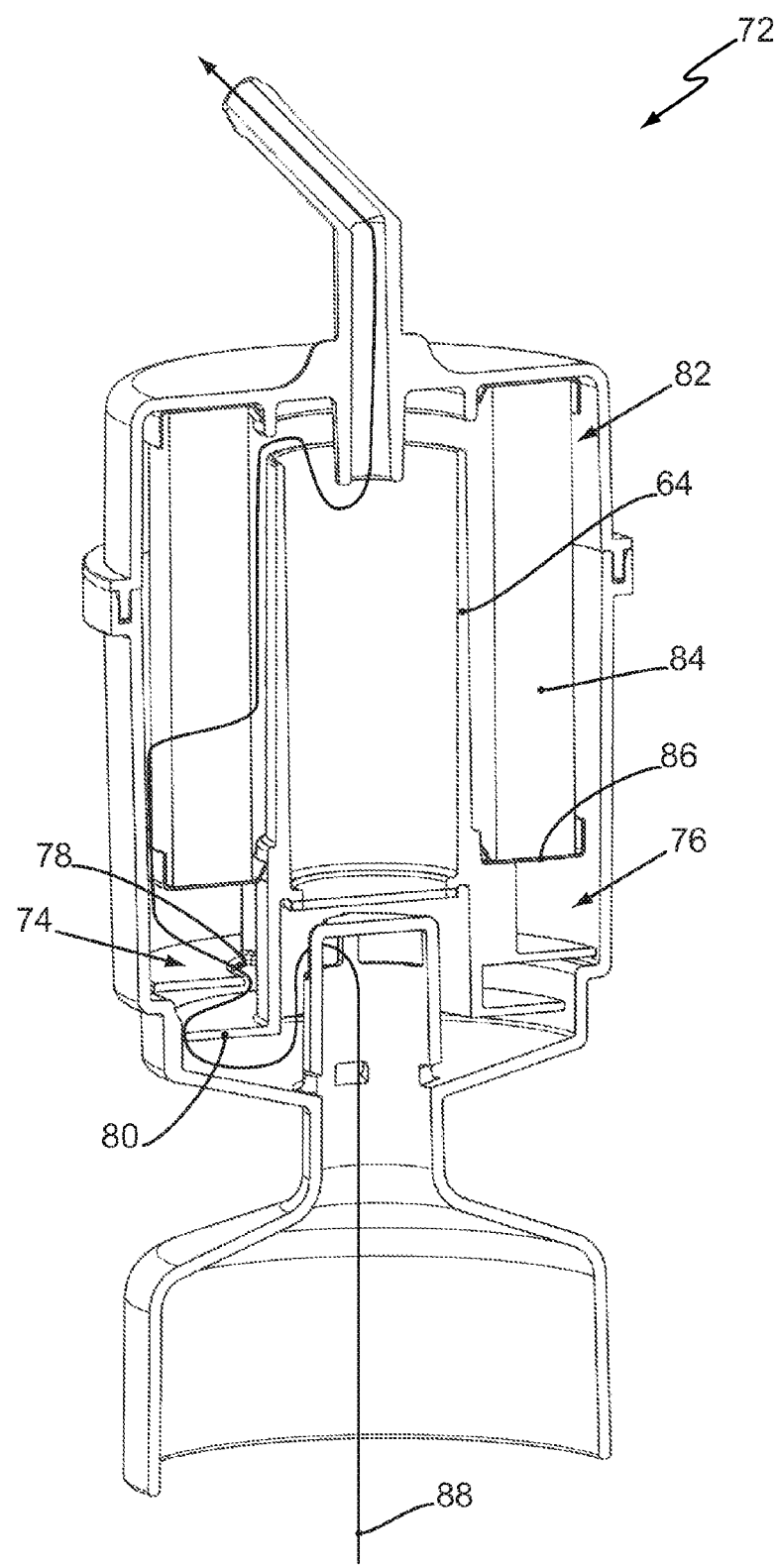
FIG. 3 shows a sectioned perspective view of a third embodiment of a tank venting filter.

FIG. 3 shows a third tank venting filter 72. The third tank venting filter 72 is identically embodied relative to the second tank venting filter 56 (see FIG. 2). However, a first plate 74 of an air guiding device 76 comprises an axially inwardly positioned passage opening 78. In contrast, a second plate 80 is formed without axial passage opening. The air must therefore travel a particularly long distance within the air guiding device 76.

A first filter element 82 has moreover, in contrast to the second tank venting filter 56, a first filter 84 which at the bottom seals tightly by an end disk 86 of metal relative to the downpipe 64.

Arrow 88 shows in an exemplary fashion the path of the air through the third tank venting filter 72.

In summarizing the above, the invention concerns a tank venting filter which, in the area of an air inlet, comprises a constriction for protection from water. The tank venting filter, in the operational state, is arranged with its longitudinal axis oriented vertically wherein the air inlet is provided at the bottom and an air outlet at the top in order to utilize water sedimentation by gravity. Above the constriction, a sedimentation chamber can be provided by means of which the constriction is spaced apart from a filter element in vertical direction. In the sedimentation chamber a labyrinth-type air guiding device can be provided in order to lengthen the path of the air to the filter element and in order to assist water separation as well as particle separation. The filter element or its bellows-shaped first filter can be protected by a downpipe from fuel backflow from the tank which is connected to an air outlet of the tank venting filter.

While specific embodiments of the invention have been shown and described in detail to illustrate the inventive principles, it will be understood that the invention may be embodied otherwise without departing from such principles.

What is claimed is:

1. A tank venting filter comprising:
    a housing defining a longitudinal filter axis that is vertically oriented in operation and defines a top end and a bottom end of the housing;
    the housing comprising an air inlet at the bottom end;
    the housing comprising an air outlet at the top end, wherein the air outlet is configured to be connected to a tank;
    the housing comprising an elongated tubular constriction above the air inlet;
    a filter element disposed in the housing and fluidically arranged between the air inlet and the air outlet;
    a downpipe extending axially between the filter element and the bottom end of the housing;
    wherein the air inlet forms the elongated tubular constriction where it enters the bottom end of the housing into an interior of the housing, the tubular constriction extending into the interior of the housing and into a radial interior of the downpipe, the tubular constriction spaced radially inwardly way from the downpipe such that a second annular gap is formed between a radial inner side of the downpipe and the tubular constriction, the tubular constriction including the following openings:
        at least one air passage cutout opening into the second annular gap in the radial interior of the downpipe, at least one air passage cutout for airflow entering the tank venting filter;
        at least one water passage cutout opening arranged at a bottom end of the second annular gap and arranged axially below the at least one air passage cutout, the at least one water passage cutout returning water or liquids from the tank venting filter into the air inlet;
    wherein a water drain passage is formed between an interior of the downpipe and the bottom end of the housing, the water drain passage arranged to drain water into the at least one water passage cutout of the tubular constriction;
    an annular plate is secured on the radial exterior of the downpipe, the annular plate extending radially outwardly from the downpipe towards a radial inner side of the housing;
    wherein an annular sedimentation chamber in the housing surrounds the downpipe between the annular plate and the bottom of the filter element;
    wherein a flow passage is formed between the annular plate and radial interior of the housing, the flow passage in communication with the at least one air passage cutout of the tubular constriction and opening into the annular sedimentation chamber.

2. The tank venting filter according to claim 1, wherein the elongated tubular constriction comprises an opening cross-section surface area that is less than 40% of an opening cross-section surface area of the air inlet.

3. The tank venting filter according to claim 2, wherein the opening cross-section surface area of the elongated tubular constriction is less than 30% of the opening cross-section surface area of the air inlet.

4. The tank venting filter according to claim 3, wherein the opening cross-section surface area of the elongated tubular constriction is less than 20% of the opening cross-section surface area of the air inlet.

5. The tank venting filter according to claim 4, wherein the opening cross-section surface area of the elongated tubular constriction is less than 10% of the opening cross-sectional surface area of the air inlet.

6. The tank venting filter according to claim 1, further comprising
    a multi-angled air guiding device disposed fluidically between the elongated tubular constriction and the filter element,
    wherein the multi-angled air guiding device is formed at least in part by the elongated tubular constriction, the at least one air passage cutout, the second annular gap and the annular plate.

7. The tank venting filter according to claim 1, wherein the at least one air passage cutout comprises a greater opening cross-section surface area than the at least one water passage cutout.

8. The tank venting filter according to claim 1, further comprising
a second filter arranged fluidically between the downpipe and the air inlet.

9. The tank venting filter according to claim 8, wherein the second filter is permeable for a liquid.

10. The tank venting filter according to claim 9, wherein the liquid is fuel or a urea solution.

11. The tank venting filter according to claim 1, wherein the filter element comprises:
- a hollow annular filter body having an open interior;
- an annular bottom end disk end disk secured to a bottom end of the hollow annular filter body;
- wherein the downpipe is arranged within the hollow interior of the filter body and extends axially outwardly through the bottom end disk and then continuing outwardly away from the filter element towards the bottom end of the housing;
- wherein the downpipe is spaced radially inwardly away from a radial inner side of the annular filter body such than an annular gap is formed between the downpipe and the radial inner side of the annular filter body;
- wherein a radial exterior of the downpipe is affixed to and closed off to the bottom end disk, closing off the annular gap at the bottom end disk of the filter element.

* * * * *